(12) United States Patent
Shankar et al.

(10) Patent No.: US 7,912,877 B2
(45) Date of Patent: Mar. 22, 2011

(54) LEVERAGING GARBAGE COLLECTION TO DYNAMICALLY INFER HEAP INVARIANTS

(75) Inventors: Ajeet Shankar, Berkeley, CA (US); Trishul Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 11/134,796

(22) Filed: May 20, 2005

(65) Prior Publication Data

US 2006/0265438 A1    Nov. 23, 2006

(51) Int. Cl.
*G06F 7/00* (2006.01)

(52) U.S. Cl. .................................. 707/813; 707/821

(58) Field of Classification Search .................. None
See application file for complete search history.

(56) References Cited

U.S. PATENT DOCUMENTS

| | | | |
|---|---|---|---|
| 4,862,373 A | 8/1989 | Meng | |
| 5,220,667 A | 6/1993 | Ichieda | |
| 5,333,311 A | 7/1994 | Whipple, II | |
| 5,713,008 A | 1/1998 | Falkner | |
| 5,740,443 A | 4/1998 | Carini | |
| 5,774,685 A | 6/1998 | Dubey | |
| 5,815,720 A | 9/1998 | Buzbee | |
| 5,909,578 A | 6/1999 | Buzbee | |
| 5,925,100 A | 7/1999 | Drewry et al. | |
| 5,940,618 A | 8/1999 | Blandy et al. | |
| 5,950,003 A | 9/1999 | Kaneshiro et al. | |
| 5,950,007 A | 9/1999 | Nishiyama et al. | |
| 5,953,524 A | 9/1999 | Meng et al. | |
| 5,960,198 A | 9/1999 | Roediger et al. | |
| 6,026,234 A | 2/2000 | Hanson et al. | |
| 6,073,232 A | 6/2000 | Kroeker et al. | |
| 6,079,032 A | 6/2000 | Peri | |
| 6,145,121 A | 11/2000 | Levy et al. | |
| 6,148,437 A | 11/2000 | Shah et al. | |
| 6,189,036 B1 | 2/2001 | Kao | |
| 6,216,219 B1 | 4/2001 | Cai et al. | |
| 6,233,678 B1 * | 5/2001 | Bala .............................. 712/240 |
| 6,311,260 B1 | 10/2001 | Stone et al. | |
| 6,321,240 B1 * | 11/2001 | Chilimbi et al. ........................ 1/1 |
| 6,330,556 B1 * | 12/2001 | Chilimbi et al. ....................... 1/1 |
| 6,360,361 B1 | 3/2002 | Larus et al. | |
| 6,370,684 B1 * | 4/2002 | De Pauw et al. .............. 717/124 |
| 6,381,735 B1 | 4/2002 | Hunt | |

(Continued)

OTHER PUBLICATIONS

Chen, Hao. "Using build integrated static checking to preserve correctness invariants," ACM, Oct. 2004.*

(Continued)

*Primary Examiner* — John R. Cottingham
*Assistant Examiner* — Alexandria Y Bromell
(74) *Attorney, Agent, or Firm* — Klarquist Sparkman, LLP

(57) ABSTRACT

A program analysis tool leverages the garbage collection process to dynamically infer invariants of objects or data structures created by a program on the heap during execution. During execution of the program in a garbage-collected execution environment, the program analysis tool tracks object allocations made by the program, and records some meta data relating to invariants tracked for the type of the object, which are initially assumed satisfied by the object. Whenever a garbage collection pass visits the object, the tool checks whether the object still satisfies the invariants, and updates the meta data accordingly. The tool finally reports the invariants reflected by the meta data upon the object's death or at termination of the program. The invariants can then be used to annotate the program source code and/or detect bugs that violate the invariants.

15 Claims, 8 Drawing Sheets

U.S. PATENT DOCUMENTS

| | | | |
|---|---|---|---|
| 6,404,455 | B1 | 6/2002 | Ito et al. |
| 6,446,257 | B1* | 9/2002 | Pradhan et al. ............... 717/154 |
| 6,560,693 | B1 | 5/2003 | Puzak et al. |
| 6,560,773 | B1* | 5/2003 | Alexander et al. ............ 717/128 |
| 6,571,318 | B1 | 5/2003 | Sander et al. |
| 6,598,141 | B1 | 7/2003 | Dussud et al. |
| 6,628,835 | B1 | 9/2003 | Brill et al. |
| 6,651,243 | B1 | 11/2003 | Berry et al. |
| 6,658,652 | B1* | 12/2003 | Alexander et al. ............ 717/128 |
| 6,675,374 | B2 | 1/2004 | Pieper et al. |
| 6,704,860 | B1 | 3/2004 | Moore |
| 6,738,968 | B1* | 5/2004 | Bosworth et al. ............ 717/157 |
| 6,848,029 | B2 | 1/2005 | Coldewey |
| 6,886,167 | B1 | 4/2005 | Breslau et al. |
| 6,904,590 | B2 | 6/2005 | Ball et al. |
| 6,951,015 | B2 | 9/2005 | Thompson |
| 6,957,422 | B2 | 10/2005 | Hunt |
| 7,032,217 | B2 | 4/2006 | Wu |
| 7,058,936 | B2 | 6/2006 | Chilimbi et al. |
| 7,140,008 | B2 | 11/2006 | Chilimbi et al. |
| 7,159,038 | B2 | 1/2007 | Rychlicki |
| 7,181,730 | B2* | 2/2007 | Pitsianis et al. ............... 717/132 |
| 7,293,260 | B1 | 11/2007 | Dmitriev |
| 7,296,180 | B1* | 11/2007 | Waterhouse et al. ............ 714/6 |
| 7,343,598 | B2 | 3/2008 | Chilimbi et al. |
| 7,401,324 | B1 | 7/2008 | Dmitriev |
| 7,506,317 | B2 | 3/2009 | Liang et al. |
| 7,587,709 | B2 | 9/2009 | Chilimbi et al. |
| 7,607,119 | B2 | 10/2009 | Chilimbi et al. |
| 7,770,153 | B2 | 8/2010 | Chilimbi et al. |
| 2002/0133639 | A1 | 9/2002 | Breslau et al. |
| 2002/0144245 | A1 | 10/2002 | Lueh |
| 2002/0178401 | A1 | 11/2002 | Ball et al. |
| 2003/0145314 | A1* | 7/2003 | Nguyen et al. ................. 717/158 |
| 2003/0204840 | A1 | 10/2003 | Wu |
| 2004/0015897 | A1* | 1/2004 | Thompson et al. ............ 717/140 |
| 2004/0015930 | A1 | 1/2004 | Wu |
| 2004/0025145 | A1 | 2/2004 | Dawson |
| 2004/0078381 | A1* | 4/2004 | Blandy et al. .................. 707/101 |
| 2004/0088699 | A1* | 5/2004 | Suresh ........................... 717/174 |
| 2004/0103401 | A1 | 5/2004 | Chilimbi et al. |
| 2004/0103408 | A1 | 5/2004 | Chilimbi et al. |
| 2004/0111444 | A1* | 6/2004 | Garthwaite .................... 707/205 |
| 2004/0133556 | A1 | 7/2004 | Wolczko et al. |
| 2004/0181782 | A1 | 9/2004 | Findeisen |
| 2004/0215880 | A1 | 10/2004 | Chilimbi et al. |
| 2004/0216091 | A1* | 10/2004 | Groeschel ..................... 717/128 |
| 2005/0086648 | A1 | 4/2005 | Andrews et al. |
| 2005/0091645 | A1 | 4/2005 | Chilimbi et al. |
| 2005/0149904 | A1 | 7/2005 | Ball et al. |
| 2005/0182603 | A1 | 8/2005 | Freitas et al. |
| 2005/0235257 | A1 | 10/2005 | Ball et al. |
| 2005/0246696 | A1* | 11/2005 | Alexander et al. ............ 717/151 |
| 2006/0070040 | A1 | 3/2006 | Chilimbi et al. |
| 2006/0155791 | A1* | 7/2006 | Tene et al. ...................... 707/206 |
| 2006/0242636 | A1 | 10/2006 | Chilimbi et al. |
| 2006/0265438 | A1 | 11/2006 | Shankar et al. |
| 2006/0265694 | A1 | 11/2006 | Chilimbi et al. |
| 2007/0083856 | A1 | 4/2007 | Chilimbi et al. |
| 2007/0169000 | A1 | 7/2007 | Havin et al. |
| 2007/0244942 | A1 | 10/2007 | McCamant et al. |
| 2008/0005208 | A1 | 1/2008 | Vaswani et al. |

OTHER PUBLICATIONS

Bacon, David. "A unified theory of garbage collection," ACM, Oct. 2004.*

Ball et al., "Generating Abstract Explanations of Suprious Counterexamples in C Programs," Technical Report MSR-TR-2002-09, 13 pages, Jan. 22, 2002.*

Zorn et al., "A Memory Allocation Profiler for C and Lisp Programs," published Feb. 16, 1988, pp. 1-18.

English et al., "Loge: a self-organizing disk controller," *Proc. USENIX Winter 1992 Tech. Conf.*, San Francisco, pp. 237-251 (Jan. 1992).

Hatfield et al., "Program Restructuring for Virtual Memory," *IBM Sys. J.*, No. 3, pp. 168-192 (1971).

Kroeger et al., "Predicting Future File-system Actions from Prior Events," *Proc. USENIX Annual Tech. Conf.*, San Diego, pp. 1-10 (Jan. 1996).

Palmer et al., "Fido: A Cache that Learns to Fetch," *Proc. 17th Int'l Conf. on Very Large Databases*, Barcelona, pp. 255-264 (Sep. 1991).

Patterson et al., "Informed Prefetching and Caching," *Proc. 15th ACM Symp. on Operating System Principles*, Copper Mountain Resort, CO, pp. 79-95 (Dec. 1995).

Staelin et al., "Smart Filesystems," *Proc. USENIX—Winter '91*, Dallas, TX, pp. 45-51 (1991).

Tait et al., "Detection and Exploitation of File Working Sets," *IEEE*, pp. 2-9 (1991).

U.S. Appl. No. 11/134,812, filed May 20, 2005, Ganapathy et al.

U.S. Appl. No. 11/115,924, filed Apr. 26, 2005, Chilimbi et al.

Ammons et al., "Exploiting Hardware Performance Counters with Flow and Context Sensitive Profiling", PLDI (Jun. 1997), 12 pages.

Ammons et al., "Improving Data-Flow Analysis with Path Profiles," *SIGPLAN '98* (1998), pp. 72-84.

Anderson et al., "Continuous Profiling: Where Have All the Cycles Gone?", ACM (Nov. 1997), pp. 357-390.

Annavaram et al., "Data Prefetching by Dependence Graph Precomputation", IEEE (2001), pp. 52-61.

Arnold et al., "A Framework for Reducing the Cost of Instrumented Code", *Rutgers University Technical Report DCS-TR-424* (Nov. 2000), pp. 1-10.

Bala et al., "Dynamo: A Transparent Dynamic Optimization System", ACM (2000), pp. 1-12.

Ball et al., "Efficient Path Profiling", IEEE (1996), pp. 46-57.

Berger et al., "Composing High-Performance Memory Allocators", ACM (2001), 11 pages.

Cahoon et al., "Data Flow Analysis for Software Prefetching Linked Data Structures in Java", IEEE (2001), 12 pages.

Calder et al., "Cache-Conscious Data Placement", ACM (1998), 11 pages.

Chen et al., "Reducing Memory Latency via Non-Blocking and Prefetching Caches", ACM (1992), pp. 51-61.

Chilimbi et al., "Cache-Conscious Structure Definition", *Proceedings of the ACM SIGPLAN '99* (May 1999) 12 pages.

Chilimbi et al., "Cache-Conscious Structure Layout", *Proc. ACM SIGPLAN '99 Conf. on Programming Language Design and Impl.*, (May 1999), 12 pages.

Chilimbi et al., "Dynamic Hot Data Stream Prefetching for General-Purpose Programs", ACM (2002), 11 pages.

Chilimbi, "Efficient Representations and Abstractions for Quantifying and Exploiting Data Reference Locality", ACM (2001), pp. 191-202.

Chilimbi et al., "On the Stability of Temporal Data Reference Profiles", PACT (Sep. 2001), 10 pages.

Chilimbi et al., "Using Generational Garbage Collection to Implement Cache-Conscious Data Placement", *Proceedings of the First International Symposium on Memory Management* (Oct. 1998), vol. 34(3), pp. 37-48.

Cooksey et al., "A Stateless, Content-Directed Data Prefetching Mechanism", ACM (2002), pp. 279-290.

Cowan et al., "Buffer Overflows: Attacks and Defenses for the Vulnerability of the Decade", DARPA information survivability conference and expo (DISCEX) (2000), pp. 1-11.

Crescenzi at al., "A Compendium of NP Optimization Problems," [Downloaded from the World Wide Web on Dec. 12, 2003], 20 pages.

Dean et al., "*ProfileMe*: Hardware Support for Instruction-Level Profiling on Out-of-Order Processors", *Proc. 30th Annual Intl. Symp. on Microarchitecture* (Dec 1997), 12 pages.

Deaver et al., "Wiggins/Redstone: An on-line Program Specializer", *Proceedings of the IEEE Hot Chips XI Conference* (Aug. 1999), 29 pages.

Duesterwald et al., "Software profiling for hot path prediction: Less is more," *Ninth International Conference on Architectural Support for Programming Languages and Operating Systems* (Nov. 2000), pp. 202-211.

Eeckhout et al., "Workload Design: Selecting Representative Program-Input Pairs", *Proceedings of the 2002 International Conference on Parallel Architectures and Compilation Techniques* (2002), 12 pages.

Gloy et al., "Procedure Placement Using Temporal-Ordering Information", *ACM Transactions on Programming Languages and System*, vol. 21 (1999), pp. 111-161.

Halldorsson, "Approximations of Weighted Independent Set and Hereditary Subset Problems", *JGAA*, vol. 4, No. 1 (Apr. 2000), pp. 1-16.

Harris, "Dynamic Adaptive Pre-tenuring", *Proceedings of the International Symposium on Memory Management* (Oct. 2000), 9 pages.

Heil et al., "Relational Profiling: Enabling Thread-Level Parallelism in Virtual Machines", *Proc. 33rd International Symposium on Microarchitecture* (Dec. 2000), pp. 1-10.

Hirzel et al., "Bursty Tracing: A Framework for Low-Overhead Temporal Profiling", *4th ACM Workshop on Feedback-Directed and Dynamic Optimization* (Dec. 2001), pp. 1-10.

Hollingsworth et al., "MDL: A Language and Compiler for Dynamic Program Instrumentation", *Proc. of the International Conference on Parallel Architectures and Compilations Techniques* (Nov. 1997), 12 pages.

Hölzle et al., "Reconciling Responsiveness with Performance in Purse Object-Oriented Languages", *ACM Transactions on Programming Languages and Systems* (Jul. 1996), pp. 1-40.

Joseph et al., "Prefetching Using Markov Predictors", ACM (1997), pp. 252-263.

Jouppi, "Improving Direct-Mapped Cache Performance by the Addition of a Small Fully-Associative Cache and Prefetch Buffers", IEEE (1990), pp. 364-373.

"JProfiler Manual," ejtechnologies, GmbH (2004), pp. 1-141.

Karlsson et al., "A Prefetching Technique for Irregular Accesses to Linked Data Structures", *Sixth International Symposium on High-Performance Computer Architecture* (Jan. 2000), 12 pages.

Kistler et al., "Automated Data-Member Layout of Heap Objects to Improve Memory-Hierarchy Performance," *ACM Transactions on Programming Language and Systems*, (2000), 16 pages.

Klaiber et al., "An Architecture for Software-Controlled Data Prefetching", ACM (1991), pp. 43-53.

Larus, "Whole Program Paths," *SIGPLAN '99 Conference on Programming Languages and Design* (1999), 11 pages.

Luk et al., "Compiler-Based Prefetching for Recursive Data Structures", ACM (1996), pp. 222-233.

Melski et al., "Interprocedural Path Profiling", *University of Wisconsin* (1998), pp. 1-50.

Mowry et al., "Design and Evaluation of a Compiler Algorithm for Prefetching", ACM (1992), pp. 62-73.

Mowry et al., "Predicting Data Cache Misses in Non-Numeric Applications Through Correlation Profiling", *International Symposium on Microarchitecture* (1997), 7 pages.

Nevill-Manning et al., "Identifying Hierarchical Structure in Sequences: A Linear-time Algorithm", *Journal of Artificial Intelligence Research* (1997), 7:67-82.

Petrank et al., "The Hardness of Cache Conscious Data Placement," *29th Annual ACM Symposium on Principles of Programming Languages* (2002), 33 pages.

Roth et al., "Dependence Based Prefetching for Linked Data Structures", *Proceedings of the 8th International Conference on Architectural Support* (Oct. 1998), pp. 115-126.

Roth et al., "Effective Jump-Pointer Prefetching for Linked Data Structures", IEEE (1999), pp. 111-121.

Rubin et al., "An Efficient Profile-Analysis Framework for Data-Layout Optimizations", *POPL* (Jan. 2002), pp. 140-153.

Saavedra et al., "Improving the Effectiveness of Software Prefetching With Adaptive Execution", *IEEE* (1996), pp. 68-78.

Sastry et al., "Rapid Profiling Via Stratified Sampling", *International Symposium on Computer Architecture* (2001), pp. 1-12.

Savage et al., "Eraser: a dynamic data race detector for multighreaded programs", *ACM Transactions on Computer Systems (TOCS)* (1997), 391-411.

Seidl et al., "Segregating Heap Objects by Reference Behavior and Lifetime", *8th Int'l Conf. on Architectural Support for Programming Languages and Operating Systems* (Oct. 1998), 12 pages.

Shaham, "Automatic Removal of Array Memory Leaks in Java", (1999), 12 pages.

Srivastava, "ATOM: A System for Building Customized Program Analysis Tools", *SIGPLAN '94 Conf. on Programming Language Design and Impl.* (1994), 25 pages.

Srivastava et al., "Vulcan Binary Transformation in a Distributed Environment", *Microsoft Research, MSR-TR-99-76* (Apr. 20, 2001), pp. 1-12.

Stoutchinin et al., "Speculative Prefetching of Induction Pointers", *Proceedings of 10th International Conference on Compiler Construction* (2001), 15 pages.

"Technologies for Measuring Software Performance", *Intel Corporation* (2003), 4 pages.

Traub et al., "Ephemeral instrumentation for lightweight program profiling", *Technical report*, Harvard University (2000), pp. 1-13.

Truong et al., "Improving Cache Behavior of Dynamically Allocated Data Structures", *PACT* (1998), 8 pages.

Vanderwiel et al., "Data Prefetch Mechanisms", *ACM Computing Surveys*, vol. 32, No. 2 (Jun. 2000), pp. 174-199.

Zilles et al., "A Programmable Co-processor for Profiling", *Proceedings of the $7^{th}$ International Symposium on High Performance Architecture* (Jan. 2001), 12 pages.

Larochelle et al., "Statistically Detecting Likely Buffer Overflow Vulnerabilities," *2001 USENIX Security Symposium*, Washington, D.C., 5pp. (Aug. 2001).

Evans, "Static Detection of Dynamic Memory Errors," *SIGPLAN Conf. on Programming Language and Design Implementation*, Philadelphia, 10 pp. (May 1996).

Edwards, "Black-Box Testing Using Flowgraphs: An Experimental Assessment of Effectiveness and Automation Potential," *Software Testing, Verification and Reliability*, vol. 10, No. 4, pp. 249-262 (Dec. 2000).

Horning, "The Larch Shared Language: Some Open Problems," *Compass/ADT Workshop*, Oslo, Norway, 16 pp. (Sep. 1995).

Wahls et al., "The Direct Execution of SPECS-C++: A Model-Based Specification Language for C++ Classes," *Technical Report TR94-02b, Iowa State University Department of Computer Science*, 52 pp. (Nov. 18, 1994).

Microsoft Corporation, "Scalable Program Analysis," *Internet*, http://research.microsoft.com/spa/, 3pp., (downloaded on Sep. 5, 2003).

Kurshid et al., "An Analyzable Annotation Language," *OOPSLA '02*, Seattle, Washington, 15 pp. (Nov. 2002).

Leavens et al., "Preliminary Design of JML," *Technical Report 98-06v, Iowa State University Department of Computer Science*, 94 pp. (Jun. 1998-2003; revised May 2003).

Leino, :Checking correctness properties of object-oriented programs, *Internet*, http://research.microsoft.com/leino/paper/1, 49 pp. (Aug. 19, 2002).

Kramer, "Examples of Design by Contract in Java Using Contract, the Design by Contract™ Tool for Java™," *Object World Berlin '99, Design & Components*, 26 pp. (May 17-20, 1999).

Dor et al., "CSSV: Towards a Realistic Tool for Statically Detecting All Buffer Overflows in C," *PLDI'03*, San Diego, California, pp. 155-167 (Jun. 9-11, 2003).

Foster et al., "A Theory of Type Qualifiers," *Proc. ACM SIGPLAN '99 Conf. on Programming Language and Design Implementation (PLDI)*, Atlanta, Georgia, 12 pp. (May 1999).

Guyer et al., "An Annotation Language for Optimizing Software Libraries," *Proc. Second Conf. on Domain Specific Languages*, Austin, Texas, 14 pp. (Oct. 1999).

Dor et al., Cleanness Checking of String Manipulations in C Programs via Integer Analysis, " *Proc. $8^{th}$ Int 'l Static Analysis Symposium*, 19 pp. (Jun. 2001).

Leavens et al., "Enhancing the Pre-and Postcondition Technique for More Expressive Specifications," *Proc. World Congress on Formal Methods in the Development of Computing Systems*, Toulouse, France, 21 pp. (Sep. 1999).

Evans et al., "LCLint: A Tool for Using Specifications to Check Code," *SIGSOFT Symposium on the Foundations of Software Engineering*, 10 pp. (Dec. 1994).

Evans et al., "Splint Manual, Version 3.1.1-1," *Secure Programming Group, University of Virginia Department of Computer Science*, 121 pp. (Jun. 5, 2003).

Evans et al., "Improving Security Using Extensible Lightweight Static Analysis," *IEEE Software*, pp. 42-51 (Jan./Feb. 2002).

Evans, "Using Specifications to Check Source Code," *TR-628, MIT Lab for Computer Science*, 97 pp. (Jun. 1994).

Bush et al., "A static analyzer for finding dynamic programming errors," *Software: Practice and Experience*, pp. 775-802 (2000).

Balakrishnan et al., "Analyzing Memory Accesses in χ86 Binary Executables", *Proc. 13th Intl. Conference on Compiler Construction*, LNCS 2985, pp. 5-23 (Apr. 2004).

Chilimbi et al., "Low-Overhead Memory Leak Detection Using Adaptive Statistical Profiling", *Proc. 11th Intl. Conference on Architectural Support for Programming Language and Operating Systems (ASPLOS)*, pp. 156-164 (Oct. 2004).

Demsky et al., "Role-Based Exploration of Object-Oriented Programs", *Proceedings of 24th International Conference on Software Engineering (ISCE)*, pp. 313-334 (May 2002).

Demsky et al., "Automatic Detection and Repair of Errors in Data Structures", *Proceedings of 18th ACM SIGPLAN Conference on Object-Oriented Programming Systems, Language and Applications (OOPLSA)* pp. 78-95 (Oct. 2003).

Ernst, "Dynamically Discovering Likely Program Invariants", *PhD Thesis*, University of Washington, Seattle, WA (Aug. 2000).

Hangal et al., "Tracking Down Software Bugs Using Automatic Anomaly Detection", *Proceedings of 22nd International Conference on Software Engineering (ICSE)* pp. 125-136 (Jan. 1992).

Hastings et al., "Purify: Fast Detection of Memory Leaks and Access Errors", *Winter USENIX Conference*, pp. 125-136 (Jan. 1992).

Hirzel et al., "Understanding the Connectivity of Heap Objects", *In Proceedings of International Symposium on Memory Management (ISMM)* pp. 143-156 (Jun. 2002).

Zhou et al., "AccMon: Automatically Detecting Memory-Related Bugs via Program Counter-Based Invariants", *Proceedings of 37th International Symposium on Micro-Architecture (MICRO)* Dec. 2004.

Griffioen et al., "Reducing File System Latency Using a Predictive Approach," *Proceedings of the USENIX Summer 1994 Technical Conference on USENIX*, 11 pp.

Diwan et al., "Memory-System Performance of Programs with Intensive Heap Allocation," ACM TOCS vol. 13, Issue 3, Aug. 1995, ISSN: 0734-2071.

Cifuentes, "Structuring Decompiled Graphs," Technical Report May 1994, Faculty of Information Technology, Queensland University of Technology, GPO Box 2434, Brisbane 4001, Australia (Apr. 1994), 15 pages.

Hauck, "Configuration Prefetch for Single Context Reconfigurable Coprocessors," In Proceedings of the ACM/SIGDA International Symposium on Field Programmable Gate Arrays (Feb. 1998), pp. 65-74.

Ung et al., "Optimising Hot Paths in a Dynamic Binary Translator," In Workshop on Binary Translation, Oct. 2000, pp. 55-65.

Gonzalez et al., "Eliminating Cache Conflict Misses Through XOR-Based Placement Functions," ICS 97, 997, pp. 76-83.

Chilimbi et al., "HeapMD: Identifying Heap-based Bugs Using Anomaly Detection," ACM (2006) 10 pages.

Raman, "Recursive Data Structure Profiling," Workshops on Memory System Performance, 2005, 10 pages.

Ball et al., "Automatic Predicate Abstraction of C Programs," ACM SIGPLAN Notices, vol. 36, Issue 5, pp. 203-213, May 2001.

Ball et al., "Generating abstract explanations of spurious counterexamples in C programs," Technical Report MSR-TR-2002-09, 13 pages, Jan. 22, 2002.

Ball et al., "The SLAM project: Debugging system software via static analysis," Jan. 2002, 3 pages.

Ball et al., "Boolean programs: A model and process for software analysis," Technical Report MSR-TR-2000-14, 29 pages, Feb. 29, 2000 (updated Mar. 28, 2000).

Ball et al., "Plymorphic Predicate Abstraction," Technical Report MSR-TR-2001-10, 22 pages, Jun. 17, 2002.

Ball et al., "SLAM and static driver verifier: Technology transfer of formal methods inside Microsoft," Technical Report MSR-TR-2004-08, 20 pages, Jan. 28, 2004.

Bloem et al., "Symbolic Guided Search for CTL Model Checking," 37th Design Automation Conference, 6 pages, Jun. 2000.

Boehm, "Two-Level Tree Structure for Fast Pointer Lookup," <http://web.archive.org/web/20021202232247/http://www.hpl.hp.com/personal/Hans_Boehm/gc/tree.html>, 4 pages, archived via Wayback Machine Dec. 12, 2002, retrieved Sep. 13, 2010.

Chen et al., "An Empirical Study on the Granularity of Pointer Analysis in C Programs," Languages and Compilers for Parallel Computing, 15th Workshop, 10 pages, Jul. 2002.

Clarke et al., "Predicate Abstraction of ANSI-C Programs Using SAT," Formal Methods in System Design, 25, pp. 105-127, Sep. 2004.

Havelund, "Using runtime analysis to guide model checking of Java programs," Proceedings of the 7th International SPIN Workshop on SPIN Model Checking and Software Verification, pp. 245-264, Aug./Sep. 2000.

Liblit et al., "Distributed Program Sampling," Department of Electrical Engineering and Computer Science, University of California, Berkely, 10 pages, 2003.

McCamant, "Improving Model Checking with Dynamic Points-to Sets," 46 slides presented at MIT on Mar. 7, 2006.

Microsoft, "Static driver verifier—Finding driver bugs at compile-time," <http://www.microsoft.com/whdc/devtools/tools/sdv.mspx>, 2 pages (accessed Apr. 1, 2006).

Mock, "Dynamic Analysis from the Bottom Up," Workshop on Dynamic Analysis, pp. 13-16, May 9, 2003.

Mock et al., "Dynamic points-to sets: A comparison wi th static analyses and potential applications in program understanding and optimization," Microsoft Research Technical Report MSR-TR-2001-38, 8 pages, published Mar. 2001.

Mock, "Program Slicing with Dynamic Points-To Sets," IEEE Transactions on Software Engineering, vol. 31, No. 8, pp. 657-678, Aug. 2005.

Muchnick et al., "Two Approaches to Interprocedural Data Flow Analysis," Chapter 7 of Program Flow Analysis: Theory and Applications, © 1981 by Prentice-Hall, Inc., pp. 189-233.

Nethercote, "Dynamic Binary Analysis and Instrumentation," Ph.D. Dissertation, University of Cambridge, 168 pages, Nov. 2004.

Ravi et al., "Hints to Accelerate Symbolic Traversal," CHARME'99, LNCS1703, pp. 250-266, Sep. 1999.

Reps et al., "Precise Interprecedural Dataflow Analysis via Graph Reachability," pp. 49-61, Conference Record of POPL'95: 22nd ACM SIGPLAN-SIGACT Symposium on Principles of Programming Languages, Jan. 1995.

Visser et al., "Model Checking Programs," Automated Software Engineering, 10, pp. 203-232, Apr. 2003.

\* cited by examiner

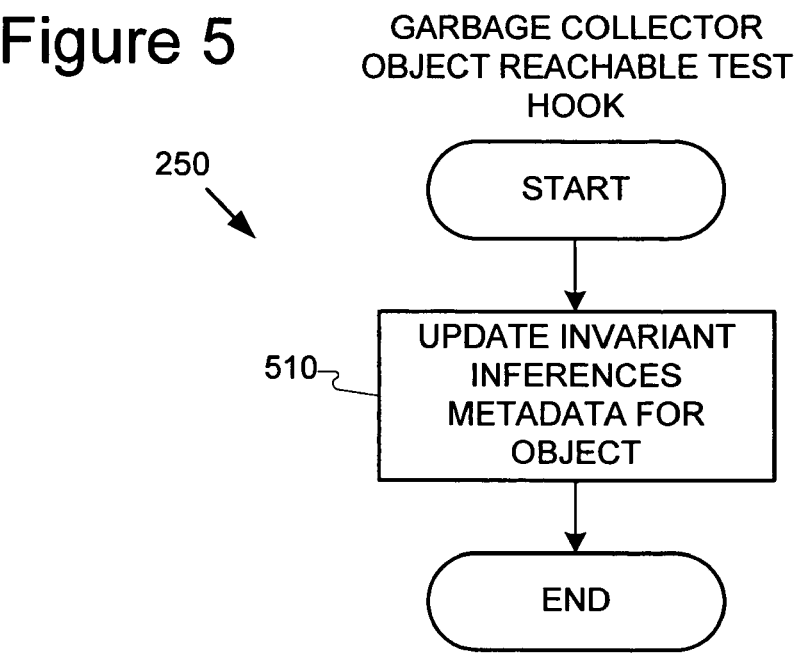
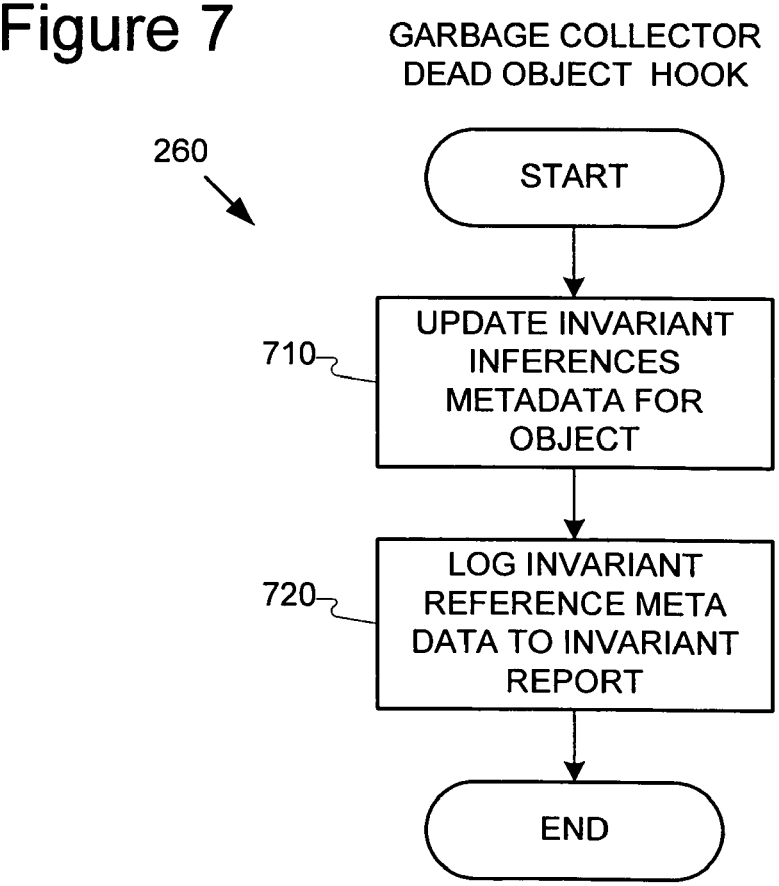

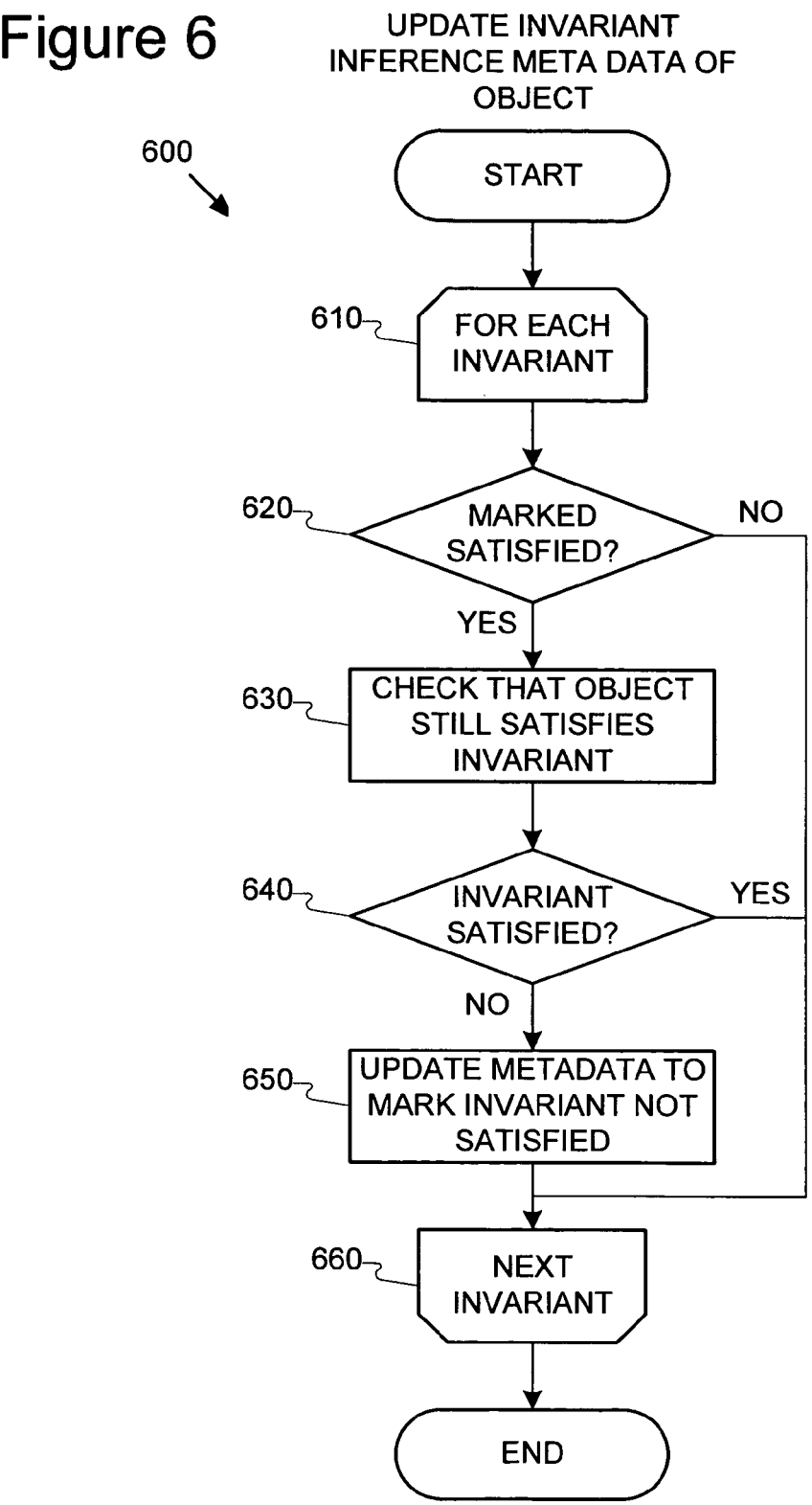

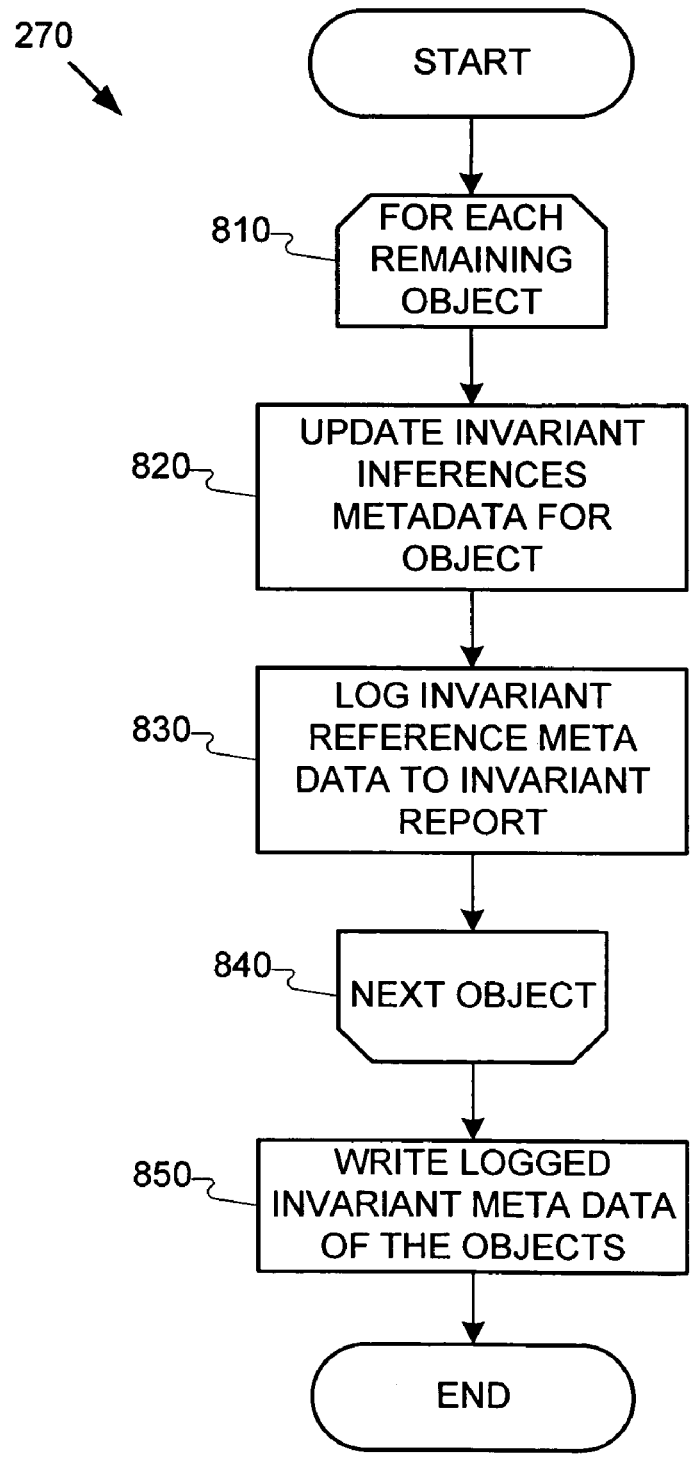

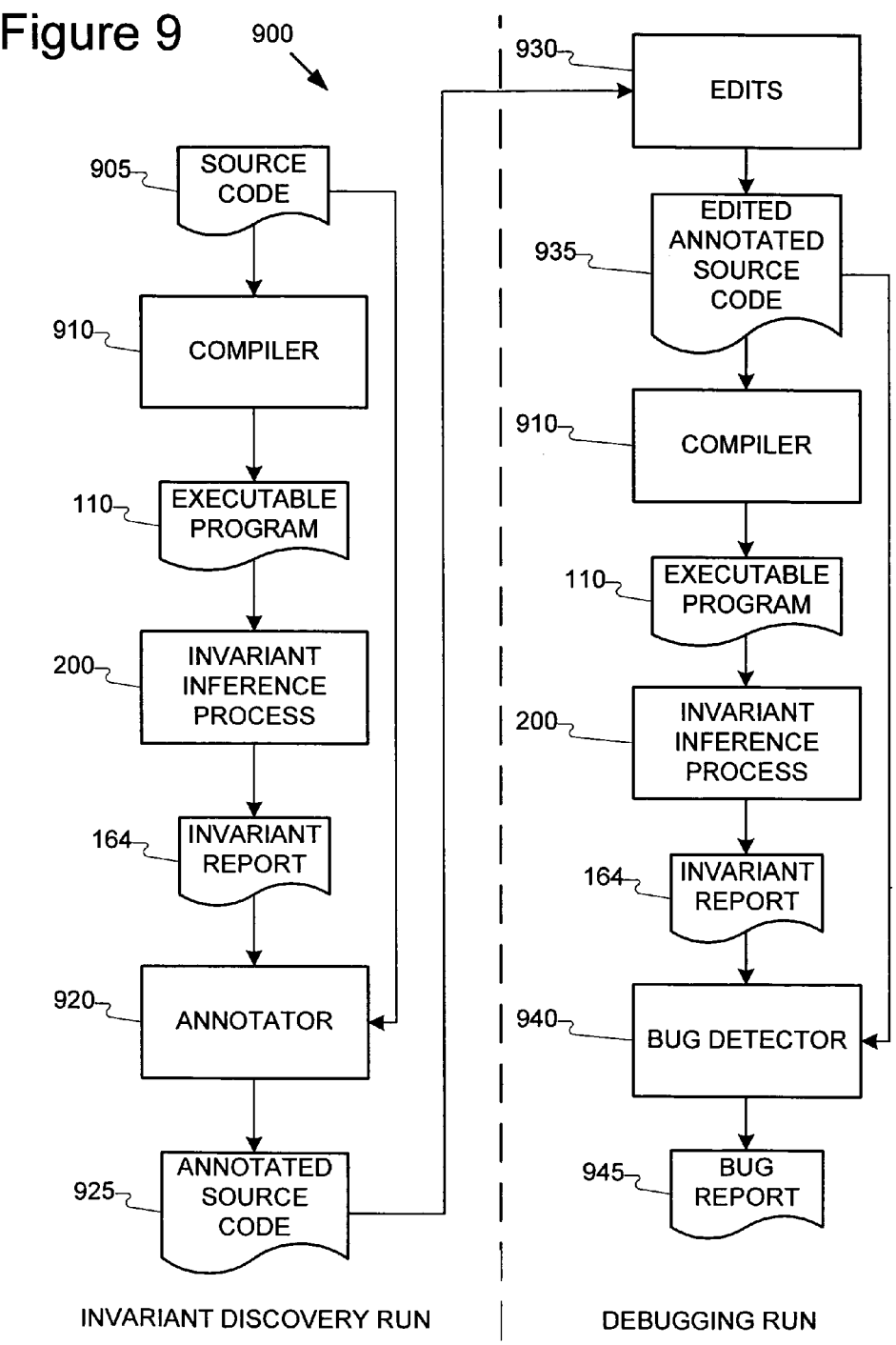

Heap Executive With Invariant Inference
Service Software 1080

LEVERAGING GARBAGE COLLECTION TO DYNAMICALLY INFER HEAP INVARIANTS

TECHNICAL FIELD

The field relates to dynamic program analysis, and tools therefor.

BACKGROUND

As defined by Microsoft® Computer Dictionary, Fourth Edition, Microsoft Press (1999), the heap is a portion of memory in a computer that is reserved for a program to use for the temporary storage of data structures whose existence or size cannot be determined until the program is running. To build and use such elements, programming languages such as C and Pascal include functions and procedures for requesting free memory from the heap, accessing it, and freeing it when it is no longer needed. In contrast to stack memory, heap memory blocks are not freed in reverse of the order in which they were allocated, so free blocks may be interspersed with blocks that are in use. As the program continues running, the blocks may have to be moved around so that small free blocks can be merged together into larger ones to meet the program's needs.

Microsoft® Computer Dictionary, Fourth Edition, Microsoft Press (1999) further defines garbage collection as, "a process for automatic recovery of heap memory. Blocks of memory that had been allocated but are no longer in use are freed, and blocks of memory still in use may be moved to consolidate the free memory into larger blocks. Some programming languages require the programmer to handle garbage collection. Others, such as Java, perform this task for the programmer."

Many currently available programming language run-time environments provide a garbage collector to actively and automatically manage heap memory. Examples of such run-time environments include run-time environments for the Java programming language, the C# programming language, and Microsoft Corporation's .Net Common Language Runtime environment. The garbage collector periodically traverses the objects in heap memory to identify objects that are no longer in use, so that the memory occupied by such dead objects or "garbage" can then be reclaimed. Although the garbage collectors may vary in design, they generally operate by tracing or traversing through the live objects by following pointers from a root object or objects of a program in the heap. Those objects still reachable by tracing pointers from the root object(s) are considered "live," whereas any of the program's objects that can no longer be reached are dead or garbage. The garbage collector then reclaims the memory occupied by such dead objects.

Modern software packages allocate and manage a vast amount of information on the heap. Object oriented languages such as Java and C# almost exclusively use the heap to represent and manipulate complex data structures. The growing importance of the heap necessitates detection and elimination of heap-based bugs. These bugs often manifest themselves in different forms, such as dangling pointers, memory leaks, and inconsistent data structures.

Unfortunately, heap-based bugs are hard to detect. The effect of these bugs is often delayed, and may be apparent only after significant damage has been done to the heap. In some cases, the effect of the bug may not be apparent. For instance, a dangling pointer bug does not crash the program unless the pointer in question is dereferenced, and on occasion, may not cause a crash even then. Consequently, software testing is not very effective at identifying heap-based bugs. Because of the non-deterministic nature of heap based bugs, even if the buggy statement is executed on a test run, it is not always guaranteed to crash the program, or produce unexpected results. Moreover, the effect of heap-based bugs is often delayed, as a result of which testing does not reveal the root-cause of the bug.

Static analysis techniques, such as shape analysis (see, e.g., M. Sagiv, T. W. Reps, and R. Wilhelm, "Parametric Shape Analysis Via 3-Valued Logic," *ACM Trans. Prog. Lang. Syst.* (*TOPLAS*), 24(3):217-298, May 2002), overcome these limitations. They examine all valid code paths, and can also provide soundness guarantees about the results of the analysis. Shape analysis has enjoyed success at determining the correctness of, or finding bugs in algorithms that manipulate heap data structures. However, in spite of recent advances (such as described by B. Hackett and R. Rugina, "Region-Based Shape Analysis With Tracked Locations," *Proc.* 32nd *Symp. on Princ. of Prog. Lang.* (*POPL*), January 2005; and E. Yahav and G. Ramalingam, "Verifying Safety Properties Using Separation And Heterogeneous Abstractions," *Proc. ACM SIGPLAN Conf. On Prog. Lang. Design and Impl.*, pages 25-34, June 2004), shape analysis algorithms are expensive, and apply only to limited classes of data structures, and properties to be checked on them. Moreover, the results of static analysis, while sound, are often overly conservative, and over approximate the possible set of heap configurations.

On the other hand, dynamic analysis techniques have the advantage of precisely capturing the set of heap configurations that arise. Several dynamic analysis tools have been developed to detect special classes of heap-based bugs. (See, e.g., T. M. Chilimbi and M. Hauswirth, "Low-Overhead Memory Leak Detection Using Adaptive Statistical Profiling," *Proc.* 11th *Intl. Conf. on Arch. Support for Prog. Lang. and Op. Sys.* (*ASPLOS*), pages 156-164, October 2004; B. Demsky and M. Rinard, "Automatic Detection And Repair Of Errors In Data Structures," *Proc.* 18th *ACM SIGPLAN Conf. on Object-Oriented Prog., Systems, Lang. and Appls.* (*OOPSLA*), pages 78-95, October 2003; R. Hastings and B. Joyce, "Purify: Fast Detection Of Memory Leaks And Access Errors," *Winter USENIX Conference*, pages 125-136, January 1992; and N. Nethercote and J. Seward, "Valgrind: A Program Supervision Framework," *Elec. Notes in Theor. Comp. Sci.* (*ENTCS*), 89(2), 2003.) However, there has been relatively little research at understanding the runtime behavior of the heap, and applying this information for bug finding.

SUMMARY

The following description details various techniques and tools for discovering data structure invariants, which are properties or characteristics of the data structure that generally do not vary during execution of the program (such as, "Foo.x is a constant" or "Object[ ] bar only contains objects of type Baz," etc.). These techniques and tools leverage the garbage collection process, in that the techniques and tools infer the invariants dynamically, at runtime, by analyzing the data structures on the heap as the garbage collector traverses the data structures.

In one exemplary implementation of this approach, the technique is implemented in a heap executive or garbage collector that performs the garbage collection process for a run-time environment in which a program executes. The program is run in this execution environment. As the program executes, the heap executive tracks object allocations made by the program, and records some meta data describing an allocated object based on the type of the object. This meta data represents the invariants that are to be inferred for the object. Initially, it is assumed that the object satisfies all the invariants that an object of its type could satisfy, and the meta data is initialized accordingly.

Then, whenever the garbage collection process is run, the heap executive updates the meta data of the objects on the heap. As the garbage collection process reaches each object, the heap executive checks which of the invariants are still satisfied by the object. For any invariants no longer satisfied by the object, the heap executive updates the meta data accordingly.

When an object dies (either when identified as garbage or at program termination), the heap executive reports the end state of the object's meta data. This end state reflects which invariants were satisfied across the lifetime of the object (although the heap executive alternatively can perform the invariant checking over some other interval).

The invariants discovered through this technique could be reintroduced to the source code as static annotations (e.g., in a language like Spec#) to facilitate further code development. Also, the invariants could be learned then enforced at runtime (or through static analysis) to find bugs—those parts of the program code that violate the invariants. In one example application, the invariants discovered by the technique are introduced back into the source code of the program as static annotations. After changes in the source code from further development of the program, the heap executive checks that the objects created by the program on the heap at run-time continue to satisfy the invariants specified in these annotations.

In another particular application, this dynamic invariant inference by leveraging garbage collection technique can be applied to the identification of heap-based bugs using anomaly detection that is described by Trishul Chilimbi and Vinod Ganapathy, "HEAP-BASED BUG IDENTIFICATION USING ANOMALY DETECTION," U.S. patent application Ser. No. 11/134,812, filed concurrently herewith (the disclosure of which is hereby incorporated herein by reference). More particularly, the heap executive implements a runtime tool that analyzes heap behavior during execution of a program to identify relatively stable properties (the invariants). The tool then detects the occurrence of anomalies deviating from the observed properties, which may lead to finding bugs.

Additional features and advantages of the invention will be made apparent from the following detailed description of embodiments that proceeds with reference to the accompanying drawings.

BRIEF DESCRIPTION OF THE DRAWINGS

FIG. 5 is a flow chart of an object reachable test hook procedure in the dynamic heap invariant inference leveraging garbage collection process of FIG. 2

FIG. 6 is a flow chart of a procedure to update invariant inference meta data in the dynamic heap invariant inference leveraging garbage collection process of FIG. 2

FIG. 7 is a flow chart of a dead object hook procedure in the dynamic heap invariant inference leveraging garbage collection process of FIG. 2

FIG. 8 is a flow chart of a procedure for invariant reporting in the dynamic heap invariant inference leveraging garbage collection process of FIG. 2

FIG. 9 is a flow diagram of an example application of the invariant inference leveraging garbage collection process used in a debugger.

DETAILED DESCRIPTION

The following description is directed to techniques for dynamic invariant inference leveraging garbage collection. The techniques are described by reference to an exemplary software analysis tool implemented in a heap executive of a run-time, program-execution environment that provides garbage collection.

1. Overview of Dynamic Invariant Inference Leveraging Garbage Collection

Figure 1:
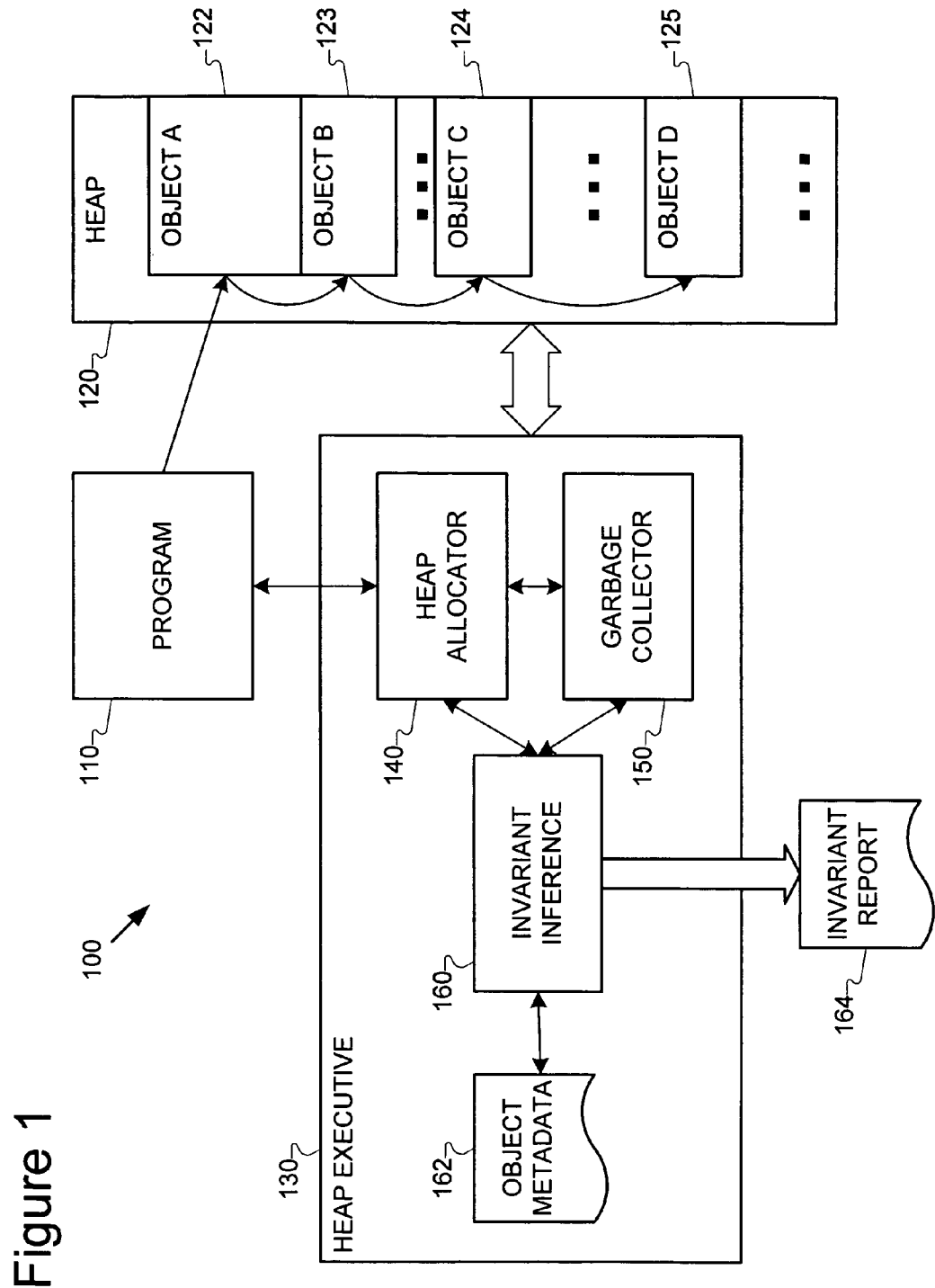
FIG. 1 is a data flow diagram of a heap executive that includes a software analysis tool to dynamically infer heap invariants for a computer program.

With reference to FIG. 1, an exemplary software analysis tool 100 for dynamic invariant inference leveraging garbage collection is implemented in a heap executive 130 of a modified version of a run-time software execution environment, such as is provided in the Microsoft Corporation .Net run-time platform or a Java virtual machine environment. Among other functions, the heap executive 130 manages memory allocation in and provides garbage collection for a heap memory 120 used by a program 110 for temporary storage of objects and other data structures 122-125. In general, the objects are structured according to object-oriented programming principles to encapsulate a data structure with a set of methods or functions that operate on the data. For expository convenience, the term "program object" is hereafter used to refer to both objects and other data structures or data elements.

The heap executive 130 provides a set of system-level services, including: a heap allocator 140 that provides allocation of heap memory for data structures to the program 110; and a garbage collector 150 that manages the allocated heap memory to reclaim memory from "dead" objects. The program 110 calls the heap allocator 140 through an application programming interface (API) to have space allocated on the heap 120 for data structures or objects that the program dynamically creates during its execution. The garbage collector 150 periodically runs a garbage collection process, which traverses the objects created by the program on the heap 120 to identify and reclaim space from any of the program's objects that are no longer reachable (i.e., "dead"). The heap allocator 140 and garbage collector 150 can employ conventionally known memory allocation and garbage collection processes.

The heap executive 130 additionally includes an invariant inference service 160 that implements the dynamic invariant inference leveraging garbage collection technique described herein. The invariant inference service 160 hooks the heap allocator 140 and garbage collector 150 services, so that the invariant inference service 160 can create and update meta data 162 about the objects created by the program 110 on the heap 120 as the program executes. The invariant inference service 160 also creates an invariant report 164 with information of the invariants it has inferred about the objects 122-125 on the heap.

2. Dynamic Invariant Inference Leveraging Garbage Collection Process

Figure 2:
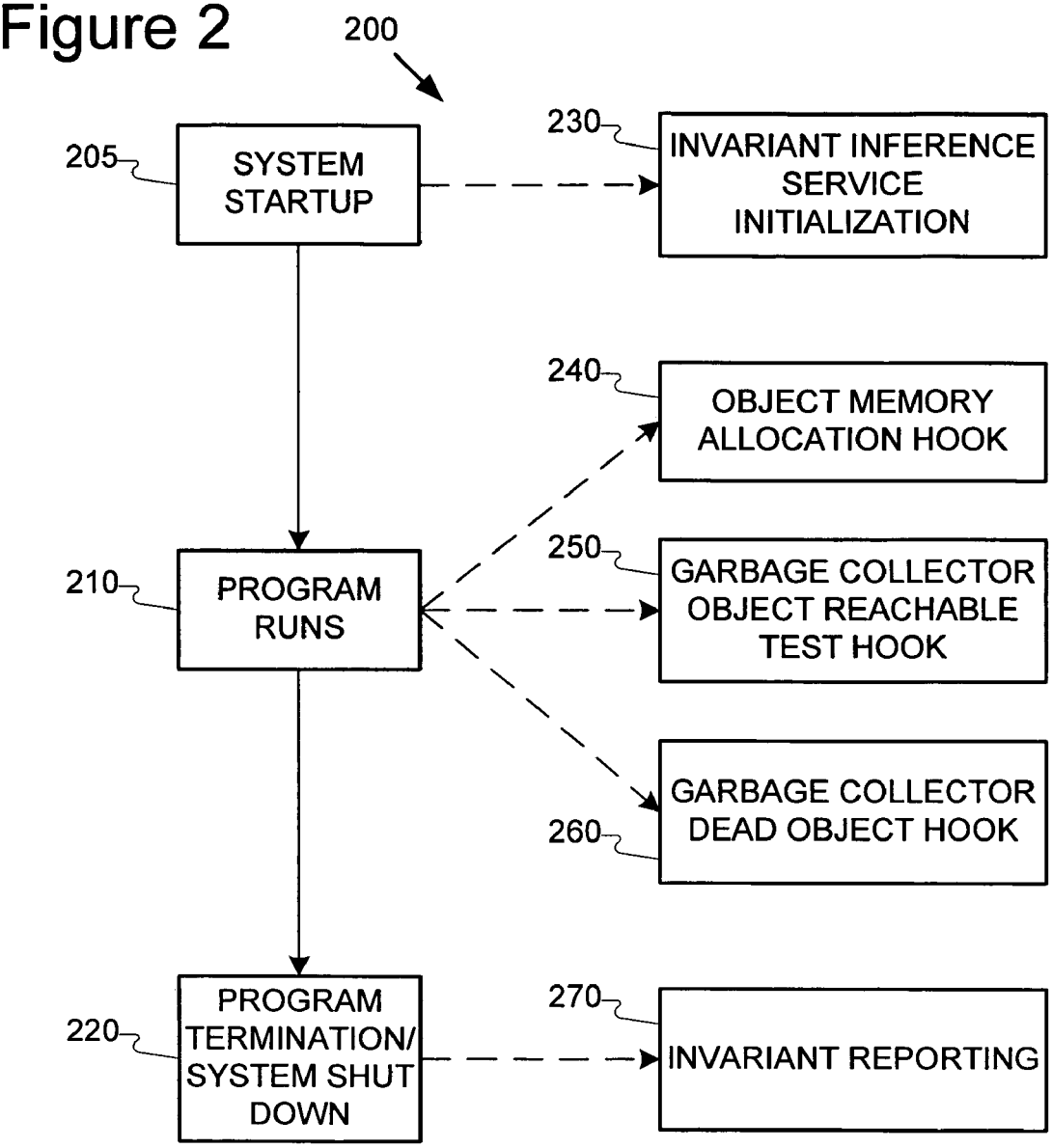
FIG. 2 is a flow diagram of an overall process for leveraging garbage collection to dynamically infer heap invariants using the software analysis tool of FIG. 1.

With reference now to FIG. 2, the invariant inference service 160 leverages upon the garbage collection work performed by the garbage collector 150 to also infer various heap invariants about the program 110 under test. The invariant inference service 160 discovers invariants dynamically as the program is run, by analyzing the data structures on the heap as the garbage collector traverses the objects in a garbage collection pass. As is conventionally known, the garbage collector periodically performs garbage collection on the heap as the program runs. The garbage collector traverses the data structures allocated on the heap starting from the program's root objects, and test whether the data structures are reachable (also herein referred to as a liveness or vitality check). The data structures that are no longer reachable from the root objects are considered dead, and the memory that they occupied is reclaimed to the free memory pool for use in subsequent memory allocation.

In general, the basic operation of the invariant inference service 160 (invariant inference leveraging garbage collection process 200) is to track object allocations of the program 110 and store some meta data representing invariants of the objects based on their respective type. In the exemplary implementation, the invariant inference service optimistically assumes that the object will satisfy the invariants that an object of its type could satisfy. When the garbage collection is periodically run, the invariant inference service updates the meta data of the objects. When the garbage collection visits each object on the heap to test whether the object is reachable, the invariant inference service also checks whether the object satisfies the various invariants that it is tracking for the object. The invariant inference service updates the meta data of an object accordingly for any invariants that the object is found to no longer satisfy. When the object dies (e.g., from garbage collection or at program termination), the invariant inference service reports the final state of the invariants that it has tracked. The invariant inference service can compile a report of the heap invariants over the life of the program, possibly including a post-processing or off-line analysis of the invariant data.

The exemplary implementation of the invariant inference service performs this heap invariant inference technique by inserting various hooks at various points into the normal heap management operations performed by the heap executive (i.e., memory allocation by the heap allocator API service 140 and the garbage collection operations of the garbage collector 150). More particularly, the invariant inference service inserts an invariant inference service initialization routine 230 at system startup of the heap executive 130. For tracking invariants while the program 110 runs (at stage 210), the invariant inference service inserts a hook 240 at object allocation by the heap allocator 140, and hooks 250, 260 at the points that the garbage collector performs its object reachable test on an object and processes a dead object in its periodic garbage collection passes. Then, at the program termination and system shut down stage 220, the invariant inference service inserts an invariant reporting procedure 270. These parts of the invariant inference service are described in more detail below.

In this exemplary implementation of the invariant inference service, the invariants are inferred across the lifetime of objects, although the inference could alternatively be performed over other periods.

Figure 3:
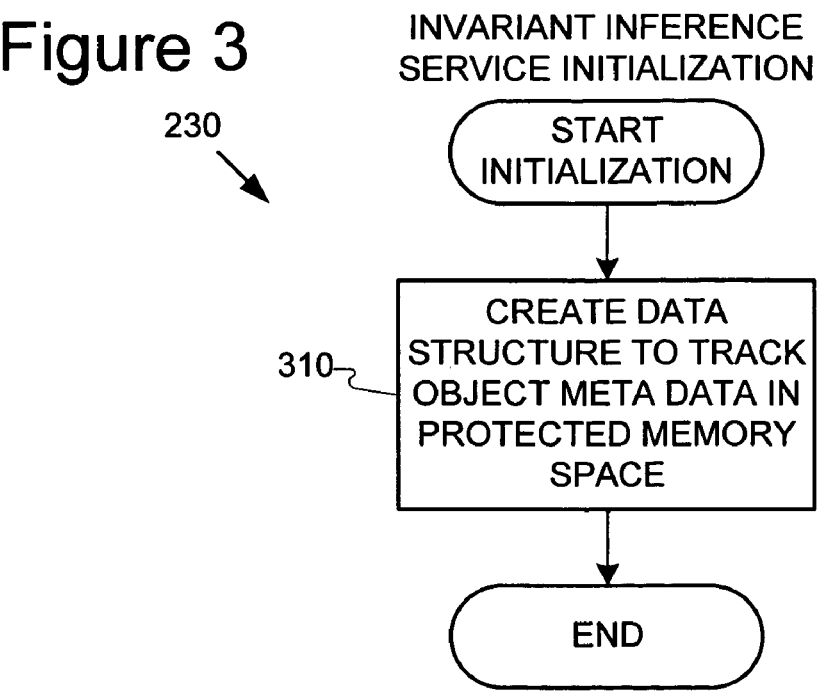
FIG. 3 is a flow chart of an invariant inference service initialization in the dynamic heap invariant inference leveraging garbage collection process of FIG. 2

FIG. 3 shows the invariant inference service initialization 230 performed at startup 205 (FIG. 2) of the invariant inference service. At operation 310 in the initialization 300, the invariant inference service 160 creates data structures to hold the meta data 162 used to track object invariants in a protected area of memory (i.e., a part of memory that is not managed by the heap allocator and garbage collector, so as to avoid the invariant inference service looping or interfering with its own operation).

Figure 4:
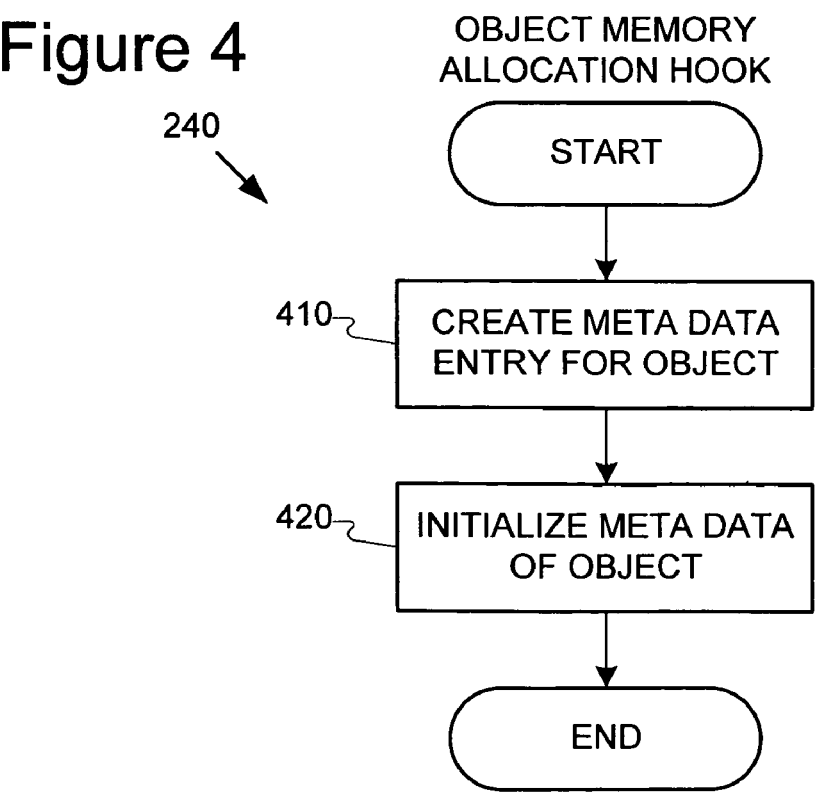
FIG. 4 is a flow chart of an object memory allocation hook procedure in the dynamic heap invariant inference leveraging garbage collection process of FIG. 2

FIG. 4 shows the invariant inference service's object memory allocation hook 240 (FIG. 2). With this hook procedure, the invariant inference service hooks each time the program 110 requests a memory allocation from the heap allocator 140 (FIG. 1) to create a new object on the heap 120. At operation 410 in the memory allocation hook 240, the invariant inference service 160 creates a meta data entry for the new object in its object meta data 162. The invariant inference service probes for the type of the object, and allocates the meta data entry corresponding to the type. At operation 420, the invariant inference service 160 initializes this meta data to reflect the assumption that the object satisfies all the invariants that are to be inferred about the object based on its type. The invariant inference service also adds information in its meta data to associate the address of the object with its meta data, such as using a hash table. In this exemplary implementation, the invariant inference service defers testing the invariants until a next iteration of the garbage collection process (using its garbage collection object reachable test hook 250 described below). This is because the heap object generally is not yet initialized (all its fields are NULL) at memory allocation.

In an alternative implementation of the invariant inference service, the invariant inference service could also defer creating and initializing the meta data for the object until the garbage collection iteration following the object's creation. This would potentially enhance efficiency by avoiding allocating meta data for short-lived objects that do not survive long enough after memory allocation to reach a garbage collection. However, the exemplary invariant inference service allocates the meta data at the memory allocation hook to also collect information as to the call site of the allocator for invariants relating to this information.

FIG. 5 shows the invariant inference service's hook 250 into the garbage collector's object reachable test. As previously discussed, the garbage collector traverses the objects in the heap during an iteration of the garbage collection process and tests whether each object is still reachable, and alive. The invariant inference service hooks this point in the garbage collection process to also check whether the invariants remain satisfied as each object is visited by the garbage collector 150. At operation 510 of the hook 250, the invariant inference service 162 updates its invariant inferences (using procedure 600 in FIG. 6 described below), by checking that the invariants remain satisfied and updating the meta data tracking the invariants for the object accordingly.

More specifically, FIG. 6 shows the invariant inference service's procedure 600 to update its invariance inferences. As indicated at operations 610, 600, the invariant inference service repeats an iteration of the procedure for each invariant that it is tracking in its meta data for the respective heap object. At operation 620, the service 160 checks whether the current invariant being checked is still marked as satisfied in the meta data 162. If so, the service 160 tests whether the invariant is still satisfied by the object at operation 630. (The service 160 forgoes re-testing the invariant if the invariant was marked as not satisfied in an update of the invariant inferences during a previous garbage collection iteration.) If the test shows the invariant is no longer satisfied, the service updates the meta data to show that the invariant was not actually satisfied by the object at operation 650. Otherwise, the meta data is left unchanged, and the service continues to repeat an iteration of the procedure checking the object for a next invariant.

FIG. 7 show the invariant inference service's hook 260 (FIG. 2) to the garbage collector's dead object reclamation. As discussed previously, when the garbage collector determines that an object is no longer reachable (called "dead"), the garbage collector reclaims the memory occupied by the dead object. The invariant inference service hooks this point in the garbage collection process to finally update the invariants that it is tracking for that object. At operation 710, the invariant inference service again updates the invariant inferences for the object using the procedure 600 (FIG. 6). The invariant inference service then logs the final state of the invariant inferences to the invariant report 164 at operation 720.

If the garbage collector 150 uses a garbage collection process that may move objects in the heap, the invariant inference service further hooks the garbage collector's procedure that moves objects. With this hook, the invariant inference service updates its mapping from the object address to its corresponding meta data. Also, the invariant inference service updates the meta data to appropriately reflect any pointer fields that are forwarded in the move, such as that the object's field pointing to one location has been forwarded to another location. Otherwise, a constant pointer could appear to be variable since it changes value.

FIG. 8 shows the invariant reporting procedure 270 that the invariant inference service performs at program termination or system shut-down 220 (FIG. 2). As indicated at operations 810, 840, the procedure 270 loops through the program's objects that remain on the heap at program termination. The invariant inference service updates the invariant inferences of the current object at operation 820, using the procedure 600 of FIG. 6. At operation 830, the invariant inference service then logs the final state of the invariant inferences of the current object to the invariant report 164. After looping through all the remaining objects, the invariant inference service finally outputs the invariant report at operation 850.

3. Invariants

The invariant inference service 160 can infer various invariants or characteristics of the data structures on the heap. In an exemplary implementation, the invariant inference service infers a set of generic invariants of the program's heap objects, as well as a set of type-specific invariants of the objects. In alternative implementations, the set of invariants can be extended to infer other invariants in addition to those inferred in this exemplary implementation, or can omit invariants inferred by the exemplary implementation. Further, the exemplary invariant inference service infers intra-object invariants, but alternatively can be extended to also infer inter-object invariants.

The set of generic invariants that the invariant inference service in the exemplary implementation checks for all program objects include the following invariants for each of the program object's reference fields:
1) Is the field constant?
2) Is the field ever NULL?
3) What is the least upper bound (LUB) of the types of the objects it points to?
4) How does this compare to the static type of that field? If the static type of the field is less precise than the dynamic type, this information is potentially a very useful invariant.

For the scalar fields of the object, the generic invariants inferred by the invariant inference service can include:
1) Is the field constant?
2) What is the range of the field's value?

The set of generic invariants can further include the following invariants about the object:
1) What other objects point to this object?
2) How many other objects point to this object? This information can be used to verify certain tree structures, for instance, in which an object should only be pointed to by at most one other object.
3) What types of objects point to this object?

In the exemplary implementation, the set of invariants inferred for program objects of type array t[ ] can include:
1) If t implements Comparable, is the array sorted?
2) If t is an object type,
   a) Infer the reference invariants above for each element of the array.
   b) What is the overall LUB of the program object types pointed to by the elements in the array?
      i) Is this type the same or "lower" (i.e., a child type) in the class hierarchy than t?

A number of invariants can be inferred for Collection types, such as:
1) Size (number of elements in the collection).
2) The LUB of the types of objects contained in the Collection. (Such an invariant can be very helpful in detecting the common bug in which an object of type "Bar" is mistakenly stored in a Container that is supposed to contain only objects of type Foo.)

Additionally, specific Collection types can have specific invariants, such as:
1) For an ArrayList: Is the ArrayList sorted?
2) For Stacks and Queues: What is the maximum size? What is the Average size? (Also, other more detailed size behavior of the Stack or Queue.)
3) For Hashtables: How balanced is a Hashtable? (Such an invariant can indicate a poor HashCode function, and can be used drive optimization.)

In an alternative implementation, the invariant inference service can be extended to also infer inter-object invariants in addition to intra-object invariants listed above. In one example alternative implementation, the invariant inference service infers inter-object invariants as a post-process following program termination. For use in this post-processing, the invariant inference service tracks memory addresses of the heap objects 122-125 during program execution at garbage collection iterations, and emits or logs these memory addresses in the meta-data. After program termination, the invariant inference service processes this information to reconstruct portions of the heap inferred as "constant" for a given garbage collection iteration. By then examining the object reference fields inferred as constant after program termination, the invariant inference service reconstructs the portion of the heap that has remained constant for the life of the program, and infers the inter-object invariants. This alternative implementation can then infer inter-object invariants, such as the following:
1) Invariants by type (e.g., the class of object): the service infers invariants applicable to all objects of a certain type. The service examines all objects of specific types (e.g., look at all object of a type named "Foo," or all ArrayLists, etc.), and infers invariants that are type-wide (apply across all objects of the type or class). Some examples of type-wide invariants include:
  a) All objects of a particular type (e.g., "Foo") are only pointed to by one object each.
  b) Reference fields of all objects of the type (e.g., reference fields "Bar.a" and "Bar.b" for objects of class "Bar") are always of the same type.
2) Invariants by allocation site: Structures allocated in the same function are often semantically related, e.g., Array-Lists foo and bar are always of the same length, or for every element in Set "a" there is a mapping in Hashtable "b."

The foregoing description provides representative examples of invariants that can be discovered via the invariant inference leveraging garbage collection technique, and is not intended to be comprehensive or complete. Many other invariants of program objects on the heap that are similar to those discussed above also can be discovered using this technique.

4. Applications

In one example application of the above described invariant inference leveraging garbage collection process 200 (FIG. 2), the invariants discovered by the invariant inference service 160 (FIG. 1) can be reintroduced to the source code of the program 110 in the form of static annotations specifying the invariants, which may be in the format of a language like Spec# or other similar annotation language. These annotations can be added to the source code by the programmer based on the invariant report 164 produced by the service. Alternatively, the addition of such annotations can be performed as an automated process, which processes the invariant report produced by the invariant inference service and inserts corresponding annotations for certain invariants into the program source code. The annotations can aid the programmer in better understanding the source code to facilitate further code development. In addition, the annotations can be used to enforce the invariants or to detect bugs (parts of the code that violate the invariants), either through use of static analysis of the program based on the annotations or dynamically at run time in a later execution of the program. In this way, bugs in later edits to the program that cause violation of the invariants can be more easily detected.

More particularly, in one implementation 900 of the invariant inference leveraging garbage collection process 200 in a debugger, the heap executive with the invariant inference service 160 is used on a program in development to detect the introduction of bugs during the development process. The program is subjected to the invariant inference process 200 initially in a first invariant discovery run of the program. The invariant inference process is applied again in a debugging run after further edits have been made to the program. In the initial invariant discovery run, source code 905 of the program is compiled by compiler 910 into the executable program 110. The executable program is run in the run-time environment 100 (FIG. 1) with the heap executive having the invariant inference service 160. When run in this run-time environment, the invariant inference process 200 produces the invariant report 164, as discussed above. At the annotator block 920, static annotations specifying the invariants reported in the invariant report are added to the source code. The annotator can be manually added. Alternatively, the annotator can be automated process that takes the source code and invariant reports as inputs and produces the annotated source code.

The source code then may be edited by the programmer in further development, such as to add further features to the program or otherwise modify its operation. After these edits, the edited and annotated source code is again compiled by compiler 910 into the executable program 110 and again run in the run-time environment 100. Again, the invariant inference process produces the invariant report 164. This time, a bug detector 940 processes the invariant report 164. The bug detector compares the invariants reported in this debugging run of the program to the invariants specified by the annotations in the edited and annotated source code 935. The bug detector reports any violations (differences in the reported invariants from those specified in the annotations) as bugs in a bug report 945. The bug detector can be implemented to operate as an off-line or post-process on the invariant report resulting from an execution of the program in the run-time environment. Alternatively, the bug detector can be implemented to operate in real-time in combination with the invariant inference process 200, such as also during garbage collection passes. In this way, the bug detector can detect and report violations of the annotated invariants as the program is running.

In one particular application, the invariant inference leveraging garbage collection described herein can be applied to the heap-based bug identification using anomaly detection technique described by Trishul Chilimbi and Vinod Ganapathy, "HEAP-BASED BUG IDENTIFICATION USING ANOMALY DETECTION," U.S. patent application Ser. No. 11/134,812, filed concurrently herewith (the disclosure of which is hereby incorporated herein by reference). More particularly, the invariant inference service described herein can be used to infer relatively stable properties (the invariants) of heap objects in a first execution of a program (or previous phases of execution of a long running program). Then, an anomaly detection tool (which may again be implemented using the invariant inference service) detects the occurrence of anomalies where the objects' heap behavior deviates from their previously observed invariants. The anomaly detection tool can be implemented as an off-line process that compares the invariants reported by the invariant inference service in a first execution of the program to those reported in subsequent executions. Alternatively, the anomaly detection can be implemented as a run-time tool in which the invariants tracked by the invariant inference service are compared to invariants reported in a previous execution of the program (or previous phases of execution of a long running program) to detect the occurrence of anomalies where the object deviates from the previously reported invariants.

In a further example application, the above described invariant inference leveraging garbage collection process 200 (FIG. 2) also has application to behavior-driven optimization of the program. The invariant inference process 200 can be considered as a general purpose statistics-gathering mechanism. In particular, the invariant inference process can be used to track behavior of program objects, which can suggest optimizations that can advantageously be applied to improve the program. For example, one such behavior-driven optimization application is to monitor how balanced is a Hashtable object (i.e., how even is the distribution of stored objects among the buckets of the Hashtable). This is an invariant that can be discovered via the invariant inference process 200, as discussed above. If the Hashtable is not very balanced, this is usually an inefficiency that can be addressed by adjustment, alteration or replacement of the Hash function. Therefore, by reporting such invariants of program objects relating to their behavior, the invariant inference leveraging garbage collection technique also can lead to behavior-driven optimizations.

4. Computing Environment

The above described exemplary software analysis tool 100 (FIG. 1) incorporating the heap executive with invariant inference service can be implemented on any of a variety of computing devices and environments, including computers of various form factors (personal, workstation, server, handheld, laptop, tablet, or other mobile), distributed computing networks, and Web services, as a few general examples. The software analysis tool 100 and invariant inference leveraging garbage collection techniques can be implemented in hardware circuitry, as well as in software 1080 executing within a computer or other computing environment, such as shown in FIG. 10.

Figure 10:
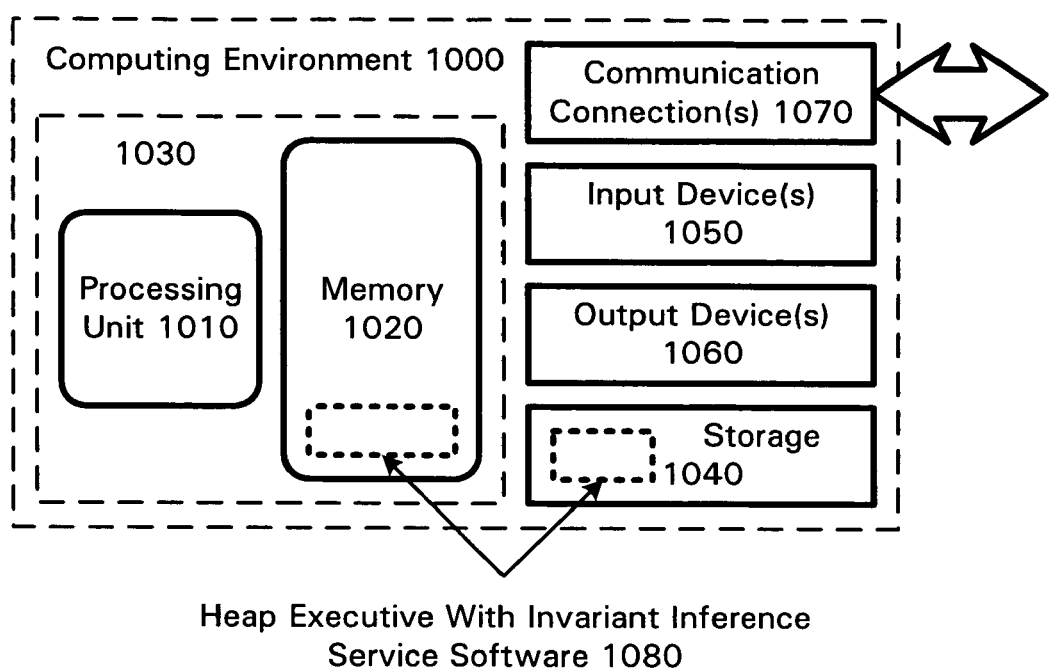
FIG. 10 is a block diagram of a suitable computing environment for implementing the dynamic invariant inference by leveraging garbage collection of FIG. 1.

FIG. 10 illustrates a generalized example of a suitable computing environment 1000 in which the described techniques can be implemented. The computing environment 1000 is not intended to suggest any limitation as to scope of use or functionality of the invention, as the present invention may be implemented in diverse general-purpose or special-purpose computing environments.

With reference to FIG. 10, the computing environment 1000 includes at least one processing unit 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. The memory 1020 stores software 1080 implementing the analysis tool 100 with heap invariant inference leveraging garbage collection.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which can be used to store information and which can be accessed within the computing environment 1000. The storage 1040 stores instructions for the software 1080 of the exemplary analysis tool implementing the heap invariant inference leveraging garbage collection techniques.

The input device(s) 1050 (e.g., for devices operating as a control point in the device connectivity architecture 100) may be a touch input device such as a keyboard, mouse, pen, or trackball, a voice input device, a scanning device, or another device that provides input to the computing environment 1000. For audio, the input device(s) 1050 may be a sound card or similar device that accepts audio input in analog or digital form, or a CD-ROM reader that provides audio samples to the computing environment. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The analysis tool and techniques herein can be described in the general context of computer-readable media. Computer-readable media are any available media that can be accessed within a computing environment. By way of example, and not limitation, with the computing environment 1000, computer-readable media include memory 1020, storage 1040, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of inferring heap invariants for program objects maintained by a program in heap memory, comprising:

causing the program to execute over a period in an execution environment having a heap memory managed using garbage collection;

creating meta data to track a set of invariants to be inferred about the program objects created by the program in the heap memory, wherein the invariants are properties of the program objects which do not vary during execution of the program;

upon a vitality check of the program objects in a garbage collection pass and during the garbage collection pass:

traversing objects in the heap memory to determine, for each object which is traversed, whether the object is reachable;

for each object in the heap memory that is traversed, as the object is traversed to determine if it is reachable, checking whether the set of invariants to be inferred about the object remain satisfied, and updating the meta data based on results of the checking;

producing data reporting the invariants satisfied by the program objects in the heap memory during the period of execution of the program;

generating an annotated program, wherein generating the annotated program comprises writing static annotations to the source code for the program specifying the invariants reported to be satisfied by at least some of the program objects in the heap memory;

compiling the annotated program with edits to the source code into an edited program; and reporting occurrences of anomalies in which the invariants are violated by the edited program in a period of execution of the edited program at least by comparing the invariants specified by the static annotations in the source code and invariants reported in the period of execution of the edited program.

2. The method of claim 1, further comprising:
when creating the meta data, initializing the meta data of the program objects to indicate the invariants are satisfied by the program objects; and
when the checking determines that an invariant is not satisfied by a program object, updating the meta data to indicate the invariant was not satisfied by said program object.

3. The method of claim 1 further comprising tracking a set of invariants that are generic to all the program objects.

4. The method of claim 1 further comprising tracking a set of type-specific invariants of the program objects according to their respective types.

5. The method of claim 1 further comprising tracking a set of invariants of the program objects based on allocation site.

6. The method of claim 1 further comprising tracking a set of type-wide invariants applicable across all program objects of a same type.

7. The method of claim 1 wherein the period of execution of the edited program is a separate debugging run after the program has been edited.

8. The method of claim 1 further comprising identifying code in the program that produced an occurrence of an anomaly as a bug.

9. The method of claim 1 further comprising identifying code in the program associated with a program object having an invariant indicative of likely inefficient behavior for possible optimization.

10. The computer-readable computer program-carrying physical storage of claim 1 wherein the program analysis tool further comprises:
identifying code in said program under test that produced an occurrence of an anomaly as a bug.

11. Computer-readable computer program-carrying physical storage having instructions which, when executed by a computer, cause the computer to perform the actions of a program analysis tool by performing analysis of a program under test to infer heap invariants of program objects maintained by said program under test in heap memory, the performing analysis of a program under test comprising:
performing the actions of a heap executive by providing a heap allocator application programming interface service to allocate memory space in heap memory upon request from said program under test;
performing the actions of a garbage collector by:
periodically performing a garbage collection pass over program objects created by said program under test in heap memory; and
testing liveness of the program objects; and
performing the actions of an invariant inference service operating across and outside of an execution of said program under test by:
maintaining meta data tracking a set of invariant inferences per program object, wherein the invariant inferences are inferences that an invariant property of the respective object does not vary during execution of the program;

at the time the garbage collector tests liveness of a program object, checking that the program object continues to satisfy the invariant inferences tracked for the respective object; and producing a report indicating the invariant properties satisfied by the program objects across the execution of said program under test; and reporting occurrences of anomalies in which the invariants are violated by the program with edited source code in a subsequent execution of the edited program at least by comparing the reported invariant properties satisfied by the program objects and invariant properties reported in the subsequent period of execution of the edited program.

12. The computer-readable computer program-carrying physical storage of claim 11 wherein performing the actions of the invariant inference service further comprises:
when creating the meta data, initializing the meta data of the program objects to indicate the invariant inferences are satisfied by the program objects; and
when its check determines that an invariant inference is not satisfied by a program object, updating the meta data to indicate the invariant inference was not satisfied by said object.

13. The computer-readable computer program-carrying physical storage of claim 11 wherein performing the actions of the invariant inference service further comprises tracking a set of invariant inferences that include inferences that at least some of generic invariants, type-specific invariants, allocation-site based invariants, type-wide invariants, and behavioral invariants are satisfied for the respective object.

14. The computer-readable computer program-carrying physical storage of claim 11 wherein performing the actions of the program analysis tool further comprises:
adding annotations to source code of said program under test based on the invariant properties reported to be satisfied by at least some of the program objects.

15. A computer implementing a dynamic program analysis system for inferring heap invariants of program objects maintained by a program in heap memory, the system comprising:
one or more physical computer processors; and
computer memory containing computer-executable instructions executing on the one or more computer processors causing the computer to perform a method, the method comprising:
causing the program to execute over a period in an execution environment having a heap memory managed using garbage collection;
creating meta data to track a set of invariants to be inferred about the program objects created by the executing program in the heap memory, wherein the meta data is created based on the types of the program objects;
holding the metadata in an area of memory that is not managed by the garbage collection;
when creating the meta data, initializing the meta data of the program objects to indicate the invariants are satisfied by the program objects;
responsive to a vitality check of the program objects during a garbage collection pass:
traversing objects in the heap memory to determine, for each object which is traversed, whether the object is reachable;
for each object that is traversed, as the object is traversed to determine if it is reachable, checking whether the set of invariants to be inferred about the program object remain satisfied and updating the meta data based on results of the checking;

updating the meta data to indicate the invariant was not satisfied by a program object, when the checking determines that an invariant is not satisfied by the program object; and if the object is no longer reachable, as the object is reclaimed, performing a final update of the meta data based on results of said checking;

responsive to termination of the program execution:

updating the meta data of the objects that remain on the heap;

logging the final state of the invariant inferences for each object remaining on the heap;

producing data, based on the logging, reporting the invariants satisfied by the program objects over the period of execution of the program; and adding static annotations to the source code of the program specifying the invariants reported to be satisfied by at least some of the program objects in the heap memory of the executing program;

compiling an annotated program with edits to the source code into an edited program; and reporting occurrences of anomalies in which invariants are violated by the edited program in a period of execution of the compiled edited program, by comparing the invariants specified by the static annotations in the source code and the invariants reported in the period of execution of the compiled edited program.

* * * * *